(12) United States Patent
Hosier et al.

(10) Patent No.: US 7,471,327 B2
(45) Date of Patent: Dec. 30, 2008

(54) IMAGE SENSOR ARRAY WITH VARIABLE RESOLUTION AND HIGH-SPEED OUTPUT

(75) Inventors: Paul A. Hosier, Rochester, NY (US); Scott L. TeWinkle, Ontario, NY (US); Roger L. Triplett, Penfield, NY (US); Jagdish C. Tandon, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 868 days.

(21) Appl. No.: 10/762,120

(22) Filed: Jan. 21, 2004

(65) Prior Publication Data

US 2005/0157192 A1  Jul. 21, 2005

(51) Int. Cl.
H04N 3/14 (2006.01)
H04N 5/335 (2006.01)
H04N 1/46 (2006.01)
(52) U.S. Cl. ...................... 348/303; 358/514
(58) Field of Classification Search ................. 358/513, 358/514; 348/283, 303, 304, 305, 320, 322, 348/323
See application file for complete search history.

(56) References Cited

U.S. PATENT DOCUMENTS

| | | | |
|---|---|---|---|
| 4,553,159 A * | 11/1985 | Moraillon | 348/280 |
| 5,081,536 A | 1/1992 | Tandon et al. | 358/213.31 |
| 5,493,335 A | 2/1996 | Parulski et al. | 348/233 |
| 5,638,121 A | 6/1997 | Hosier et al. | 348/312 |
| 6,169,576 B1 | 1/2001 | Monoi | 348/272 |
| 6,377,304 B1 | 4/2002 | Sautih | |
| 6,784,928 B1 * | 8/2004 | Sakurai et al. | 348/220.1 |
| 6,847,026 B2 * | 1/2005 | Koizumi et al. | 250/208.1 |
| 2002/0186312 A1 * | 12/2002 | Stark | 348/302 |

FOREIGN PATENT DOCUMENTS

| | | | |
|---|---|---|---|
| EP | 1 102 323 A1 | | 5/2001 |
| WO | WO 03/034714 A | | 4/2003 |

* cited by examiner

*Primary Examiner*—Sinh N Tran
*Assistant Examiner*—Albert H Cutler
(74) *Attorney, Agent, or Firm*—R. Hutter

(57) ABSTRACT

A photosensitive imaging apparatus has a linear array of groups of photosensors. In a low-resolution scanning mode, all of the photosensors in each group act together as one large photosensor. In a high-resolution scanning mode, each photosensor in a group acts outputs image-based signals independently. In either mode, the signals output by the photosensors are transferred to one of two output lines, such as for "odd-" and "even-" positioned photosensors or groups of photosensors. The signals on the two lines can then be multiplexed to a single output line. The dual output lines enable fast signal output in either resolution mode.

9 Claims, 5 Drawing Sheets

IMAGE SENSOR ARRAY WITH VARIABLE RESOLUTION AND HIGH-SPEED OUTPUT

CROSS-REFERENCE TO RELATED APPLICATIONS

The following U.S. patents are incorporated by reference for the teachings therein: U.S. Pat. Nos. 5,081,536 and 5,638,121.

TECHNICAL FIELD

The present invention relates to image sensor arrays used in raster input scanners. In particular, the invention relates to photosensitive chips wherein each photosensor has its own individual transfer circuit.

BACKGROUND

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors. A basic circuitry for such an image sensor array is given in U.S. Pat. No. 5,081,536, referenced above.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are read out from the photosensors on a chip to be converted to digital data, different video levels are output as a series of analog voltage levels; the voltage levels each correspond to the brightness of the reflected area being scanned by a particular photosensor at a particular moment.

The speed of output of each chip will depend on the voltage response of the output channel. A chip outputs a sequence of voltage levels, each voltage level corresponding to a pixel in the original image. With each pixel in the original image, the voltage level must move from a signal representative of light of the previous pixel to one representative of light in the present pixel. Because of the analog nature of a video-outputting chip, the sequence of voltage outputs from one voltage level (corresponding to one pixel) to the next is a set of asymptotic curves. When the outputs of a plurality of photosensors are read out serially, certain time must be allowed between each photosensor reading to allow the reading to settle to the value of a signal corresponding to the light impinging on the photosensor. In a typical practical system for reading out the video signals, this readout time for real-time scanning is approximately 50 nanoseconds per photosensor. With each pixel signal, what is of most interest is where the analog voltage curve "ends up"—that is, the final value of the voltage signal is what is representative of the true light intensity on the photosensor. When a set of analog video signals are output over time, the "settling time" is the portion of the output for each pixel in which the voltage level starts moving from the voltage level from the previous pixel to the voltage level of the present pixel. The settling time associated with a chip directly affects the readout speed of the chip.

A desirable feature of a photosensitive apparatus having an array of photosensors is the capability for multiple selectable imaging resolutions. For example, if a chip includes a set of photosensors spaced 600 to the inch, it may be desirable to operate the chip so that each adjacent pair of photosensors in effect operates as one photosensor, so that the effective spatial resolution of the apparatus is 300 spots per inch. A lower spatial resolution results in smaller image file sizes (which may be desirable in some scanning contexts, such as archiving, or pattern or character recognition) and can facilitate a higher readout rate. The present description relates to a photosensitive imaging apparatus which is operable at multiple resolutions.

PRIOR ART

U.S. Pat. No. 5,493,335 discloses a digital camera having a variable resolution feature. Manipulation of signals in a buffer memory downstream of an image sensor is used to enable a reduced-resolution mode.

U.S. Pat. No. 5,638,121, incorporated by reference above, teaches using separate output lines for odd and even photosensors in a linear array. The use of separate output lines provides a longer settling time for each pixel signal as an image is recorded.

U.S. Pat. No. 6,169,576 discloses a CCD device having controllable resolution.

SUMMARY

There is provided an imaging apparatus, comprising a plurality of groups of photosensors. A first output line accepts signals from a first subset of groups of photosensors, and a second output line accepts signals from a second subset of groups of photosensors. Connection means, associated with each group of photosensors, selectably operate the group of photosensors as effectively one photosensor.

There is provided a method of operating an imaging apparatus, the apparatus including a plurality of groups of photosensors, a first output line, and a second output line. In a first mode, signals are transferred from a first subset of groups of photosensors to the first output line, and from a second subset of groups of photosensors to the second output line. In a second mode, for each of a plurality of groups of photosensors, signals are transferred from a first photosensor in the group to the first output line, and from a second photosensor in the group to the second output line.

DETAILED DESCRIPTION

Figure 1:
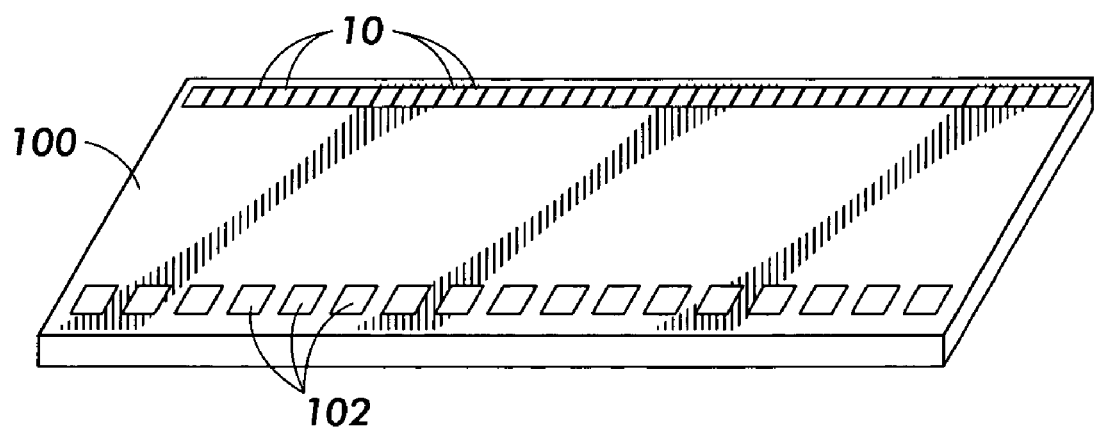
FIG. 1 is a simplified view of a photosensor array on a chip.

FIG. 1 is a simplified view of a photosensor array on chip. Such a chip 100, or a plurality thereof, would be used in, for example, an apparatus for recording hard-copy images, such as in a digital copier or facsimile. In such an apparatus, a sheet bearing an image to be recorded is moved relative to the chip and the photosensors on the chip "see," over time, a series of small areas on the sheet, and output image signals for each small area. The image signals are processed and accumulated to obtain image data describing the entire recorded image.

In essentials, the chip 100 includes a linear array of photosensors; in this particular embodiment as will be described in detail below, the chip 100 includes a linear array of groups 10 of photosensors. Each group 10 of photosensors includes, in this embodiment, a plurality of photosensors. Depending on a particular selected mode of operation, each group 10 of photosensors can effectively operate as a single, relatively large photosensor in a low-resolution mode; or, alternatively, a plurality of photosensors within each group 10 can be caused to record light and output signals independently, providing a high-resolution scan. The chip 100 may further include any number of contact pads 102, so the chip can interact with ancillary circuitry as desired.

Figure 2:
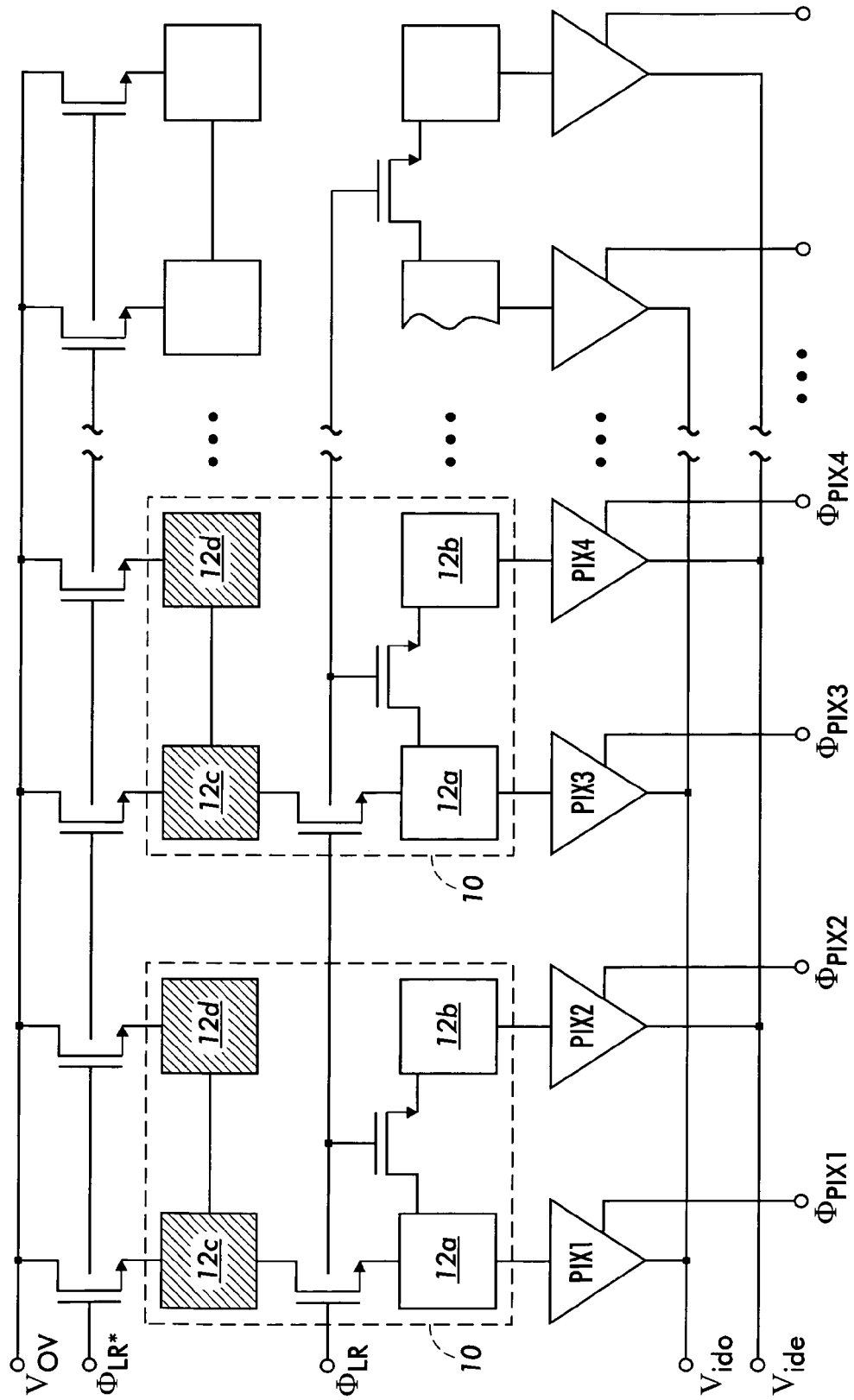
FIG. 2 is a plan, partially-schematic, view of some groups 10 of photosensors as would be found on a chip such as in FIG. 1.

FIG. 2 is a plan, partially-schematic, view of some groups 10 of photosensors as would be found on a chip such as in FIG. 1. In this embodiment, each group 10 includes a 2×2 array of photosensors, in each group marked 12a, 12b, 12c, and 12d. As will be described below, photosensors 12a, 12b in each group 10 are operable independently so that a high spatial resolution can be provided along the direction of the linear array (along the horizontal in FIG. 2). In a low-resolution scanning mode, however, the system can be operated so that every photosensor 12a, 12b, 12c, and 12d within each group 10 is, during the scanning period of "looking at" a small area in an image being recorded, connected together, by the associated transistors within each group 10, to form in effect a single large photosensor. If operating photosensors 12a, 12b in a high-resolution mode can provide a 600 spi (spots per inch) spatial resolution, operating all the photosensors 12a, 12b, 12c, and 12d in each group 10 as one photosensor provides a 300 spi spatial resolution. In this embodiment, when photosensors 12a, 12b are operating independently in high-resolution mode, photosensors 12c and 12d in each group 10 are simply not used.

Other inputs to the photosensors 12a, 12b, 12c, and 12d in FIG. 2 include an outside voltage $V_{OV}$, which is typically a constant of about 1 volt, and "line readout" signals $\Phi_{LR}$ and its complement $\Phi_{LR*}$. $V_{OV}$ and $\phi_{LR*}$ can be connected on a single line. Depending on the relative values of $\Phi_{LR}$ and its complement $\Phi_{LR*}$, the apparatus can be operated in a "low-resolution mode," in which all of the photosensors in a group 10 in effect act as one photosensor; or in a "high-resolution mode," in which each photosensor 12a, 12b in a group acts independently.

Further as can be seen in FIG. 2, the signal outputs from the photosensors are loaded into two video output lines, indicated as Vido (video odd) and Vide (video even). The signal outputs pass through one of a series of selectably-actuable amplifiers, PIX1, PIX2, PIX3, PIX4, etc., each of which lets a signal pass therethrough when activated.

Figure 3:
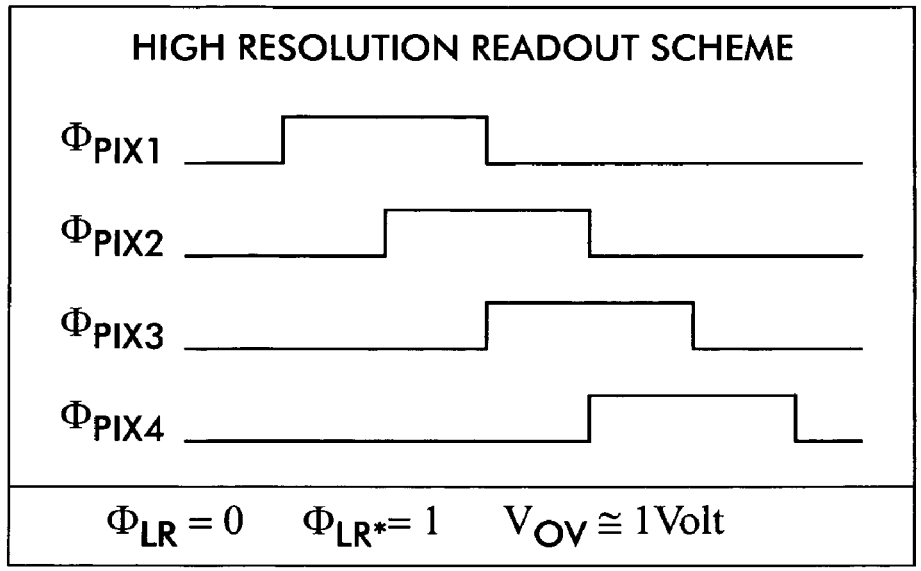
FIGS. 3 and 4 show clocking sequences with regard to the inputs to the associated amplifiers shown in FIG. 2.

In this embodiment, in high-resolution mode, every other photosensor such as 12a along the direction of the linear array sends signals to the Vido line, while the photosensors 12b along the linear array send charges to the Vide line. FIG. 3 shows a clocking sequence of inputs $\Phi_{PIX1}$, $\Phi_{PIX2}$, $\Phi_{PIX3}$, and $\Phi_{PIX4}$ with regard to the associated amplifiers, which enables this odd-even output when the photosensor 12a within each group 10 sends signals to line Vido and the photosensor 12b with each group 10 sends signals to the line Vide. In this way, the arrangement shown in FIG. 2 enables two "trains" of signals, effectively from interleaved or alternating subsets of photosensors, to be output.

The two "trains" of signals can be multiplexed downstream to form a more directly usable video signal. Why such a two-line output arrangement is desirable is explained in the U.S. Pat. No. 5,638,121 patent referenced above, which also teaches practical aspects of realizing such a system. In brief, the two-line, odd-even output system enables a faster overall output because each output signal from a photosensor must "settle" to a final value which is related to the actual amount of light energy received; the two-line system allows the settling time of adjacent odd and even photosensors to partially overlap over time as the video is output.

Figure 4:
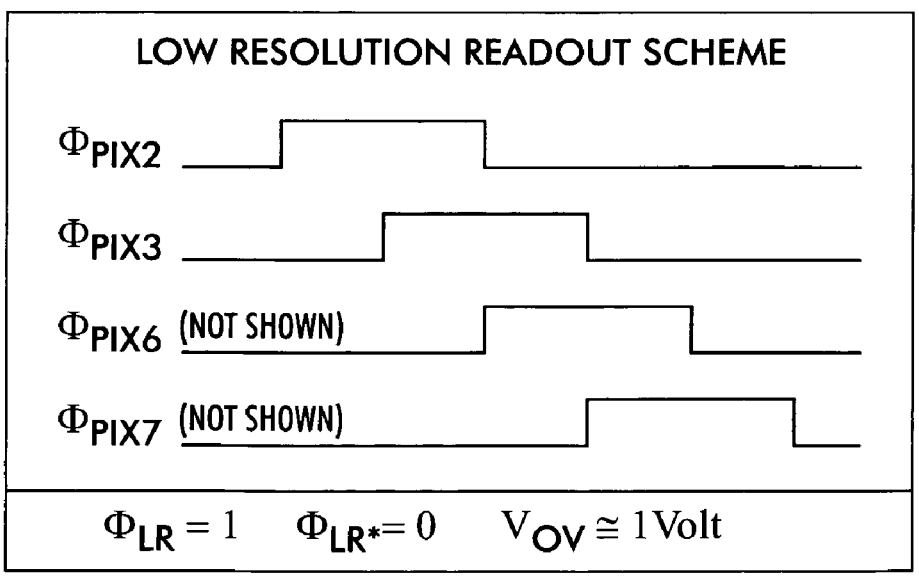

Further, according to this embodiment, the two-line, odd-even readout arrangement remains in place while the apparatus is also in its low-resolution mode, when all of the photosensors 12a, 12b, 12c, 12d in each group 10 are in effect acting together as a single photosensor. FIG. 4 shows a clocking sequence that enables this odd-even readout in low-resolution mode, with regard to the amplifiers which control the output of signals from odd and even groups 10: in FIG. 4, it can be seen that amplifiers PIX2 and PIX3 are operated while amplifiers PIX1 and PIX 4 are not (and similarly, amplifiers that would be further to the right in FIG. 2, such as PIX6 and PIX7, not shown, would be operated while PIX5 and PIX8 are not). Comparing FIG. 4 with FIG. 2, it can be seen that signals through amplifier PIX2 (and all activated amplifiers which are even-numbered) are sent from the associated photosensor group 10 to line Vide, and signals through amplifier PIX3 are (and all activated amplifiers which are odd-numbered) are sent from the associated photosensor group 10 to line Vido. Therefore, when groups 10 of photosensors are operated as single photosensors in a low-resolution operation, the two-train, odd-even output still applies. With this arrangement, the embodiment retains the two-line, odd-even output in both the low- and high-resolution modes.

Figure 5:
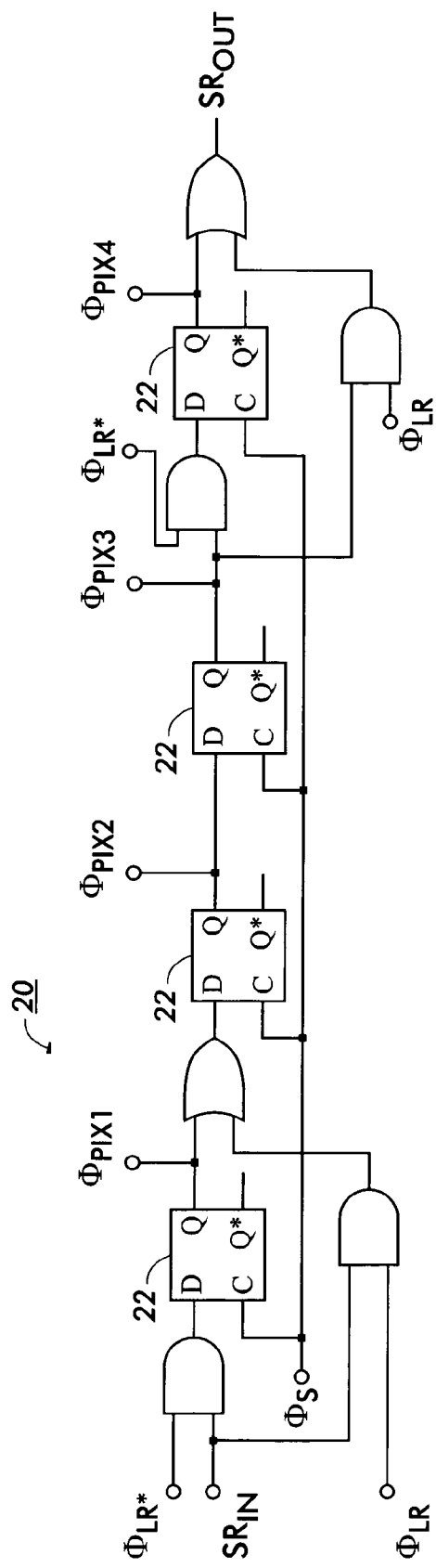
FIG. 5 is a schematic view of one embodiment of a shift register for operating any four amplifiers as shown in FIG. 2.
Figure 6:
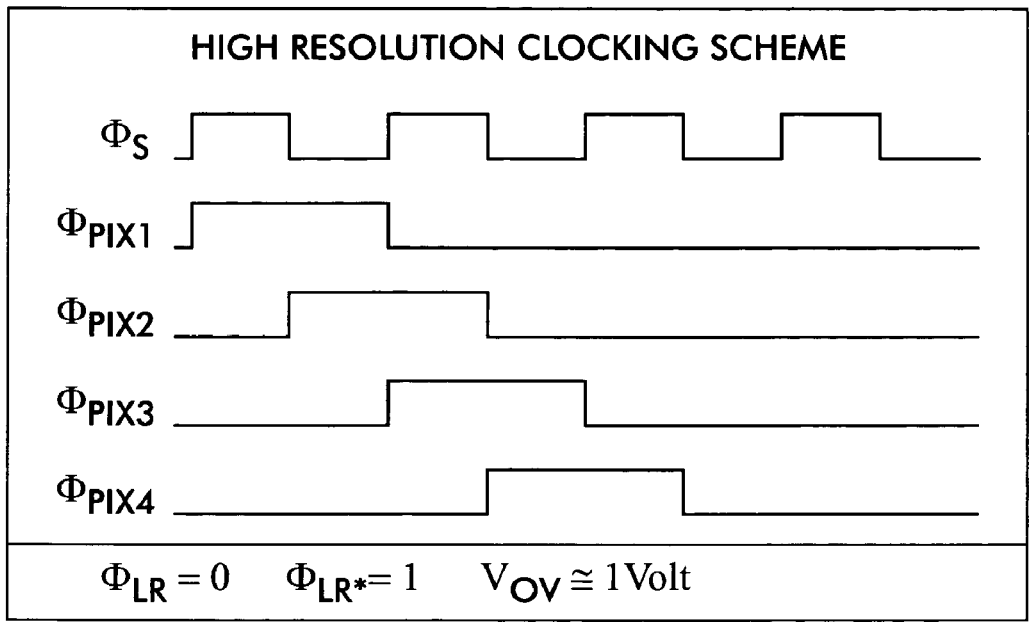
FIGS. 6 and 7 are timing diagrams showing the resulting outputs to the amplifiers in FIG. 2 when the FIG. 5 apparatus is operated in high-resolution and low-resolution modes, respectively.
Figure 7:
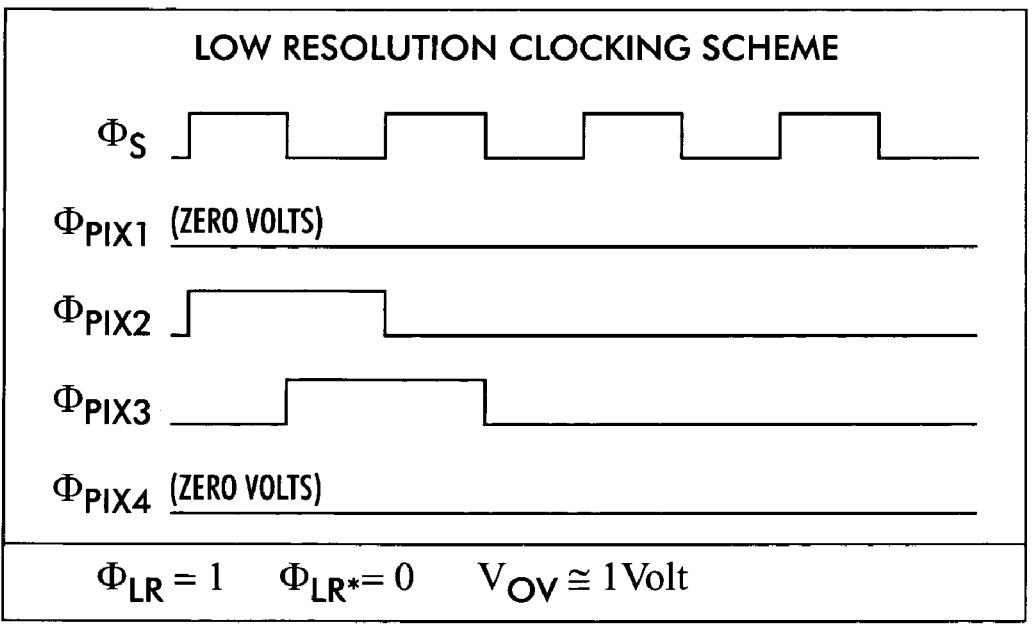

FIG. 5 is a schematic view of one embodiment of a shift register, generally indicated as 20, for operating any four amplifiers, such as PIX1, PIX2, PIX3, and PIX4 as shown in FIG. 2. As can be seen, the outputs of the shift register in FIG. 5 are operational signals for the amplifiers in FIG. 2; basically, there is one shift register stage, in the form of a flip-flop 22, corresponding to each amplifier associated with a photosensor 12a, 12b. The other connections to the shift register are the in and out connections $SR_{IN}$ and $SR_{OUT}$, and a clock signal $\Phi_S$, as well as the line readout signals $\Phi_{LR}$ and $\Phi_{LR*}$ described above. FIGS. 6 and 7 are timing diagrams showing the resulting outputs to the pixel amplifiers when the apparatus is desired to be operated in high-resolution and low-resolution modes, respectively. In FIG. 6, when $\Phi_{LR}=0$ and $\Phi_{LR*}=1$, as can be seen, all of the pixel amplifiers in the group are at one time activated within the cycle, enabling the high-resolution mode. In FIG. 7, when $\Phi_{LR}=1$ and $\Phi_{LR*}=0$, only PIX2 and PIX3 are activated to perform the low-resolution operation, and PIX1 and PIX4 are effectively not used. In the low-resolution mode, only one shift register stage is needed to operate each entire group 10.

Although the illustrated embodiment shows the two output lines respectively dedicated to "odd" and "even" (i.e., interleaved) photosensors or groups of photosensors along a linear array, the teachings can be applied to architectures in which, for instance, four subsets of evenly-distributed photosensors or groups of photosensors output into four output lines, for an even higher-speed output. Alternatively, the two output lines could be dedicated to other types of subsets of photosensors or groups of photosensors, such as corresponding to different portions along a linear array; different linear arrays; subsets which are sensitive to different primary colors, etc. Also, although the above teaching is in a context of a linear array used in hard-copy scanning, the basic teachings can be applied to two-dimensional photosensor arrays, such as used in digital cameras.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of operating an imaging apparatus, the apparatus including a plurality of groups of photosensors, wherein a first subset of groups of photosensors is substantially evenly distributed along a linear array and is substantially interleaved with the second subset of groups of photosensors along the linear array, a first output line, and a second output line, comprising:
   in a first mode, transferring signals from a first subset of groups of photosensors to the first output line, and transferring signals from a second subset of groups of photosensors to the second output line; and
   in a second mode, for each of a plurality of groups of photosensors, transferring signals from a first photosensor in the group to the first output line, and transferring signals from a second photosensor in the group to the second output line;
   wherein, in the first mode or the second mode, signals from adjacent photosensors or groups of photosensors on the first and second output lines overlap over time.

2. The method of claim 1, wherein the first mode corresponds to a low-resolution operation and the second mode corresponds to a high-resolution operation.

3. The method of claim 1, further comprising
   in the first mode, effectively connecting at least two photosensors in the group to form a single photosensor.

4. The method of claim 1, wherein the apparatus includes a shift register having a plurality of stages, and each of at least two photosensors within a group is associated with a shift register stage.

5. The method of claim 4, further comprising
   in the first mode, operating the shift register so that, for a plurality of groups of photosensors, only one shift register stage effectively operates the group.

6. An imaging apparatus, comprising:
   an odd output line for conveying odd video signals;
   an even output line for conveying even video signals; and
   a plurality of groups of photosensors, the groups being arranged in odd and even positions along a linear array;
   the photosensors in each group being connectable in a first mode to output a single video signal for the group, with the groups in odd positions outputting to the odd video line and the groups in even positions outputting to the even video line;
   the photosensors in each group being connectable in a second mode whereby a first photosensor in the group outputs to the odd video line and a second photosensor in the group outputs to the even video line; and
   means for reading out signals in the first mode or the second mode, wherein signals from adjacent photosensors or groups of photosensors on the first and second output lines overlap over time.

7. The apparatus of claim 6, the first photosensor in each group and the second photosensor in each group being arranged along the linear array.

8. The apparatus of claim 6, each group of photosensors further including a third photosensor and a fourth photosensor.

9. The apparatus of claim 6, the photosensors in each group forming a two-dimensional array.

* * * * *